Feb. 23, 1926.  1,574,146
W. J. DAVIS
MOTOR VEHICLE DIRECTION INDICATING SIGNAL
Filed July 7, 1925
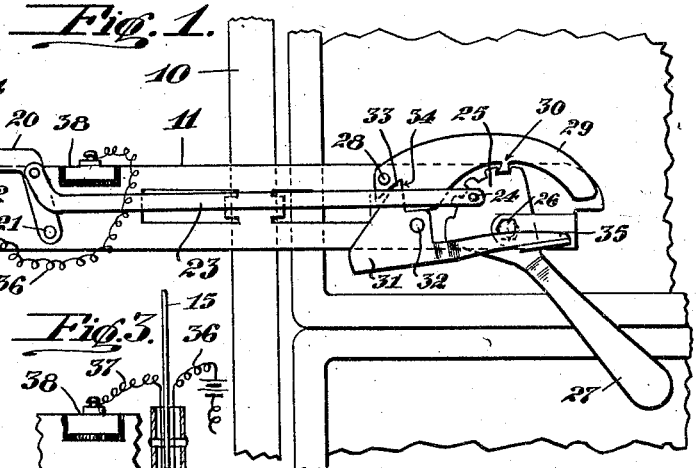
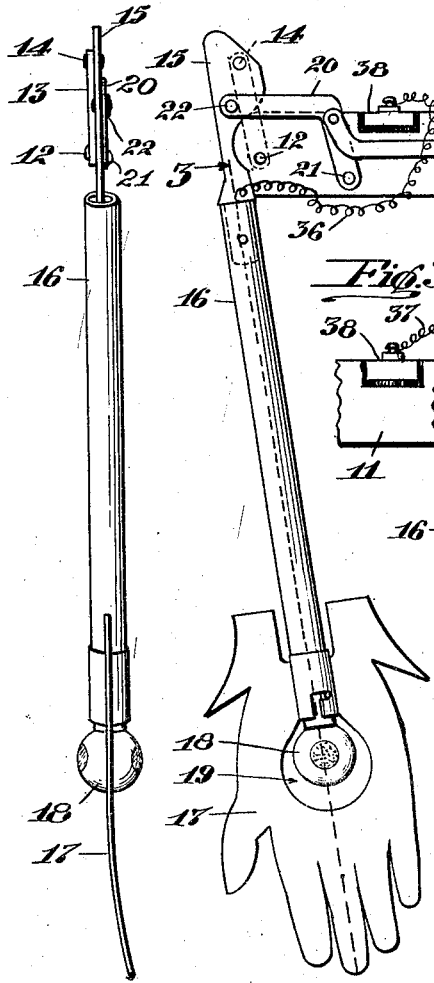
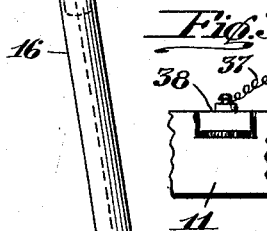
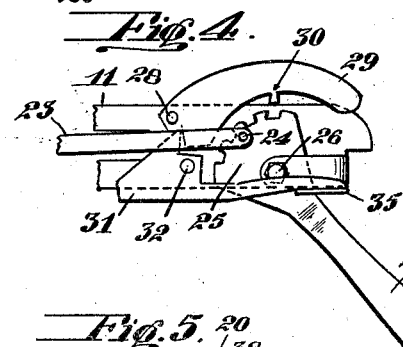
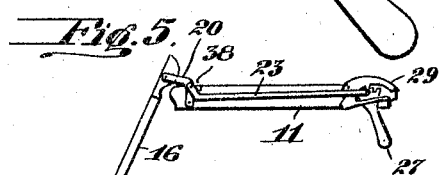
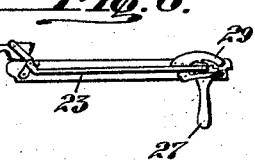
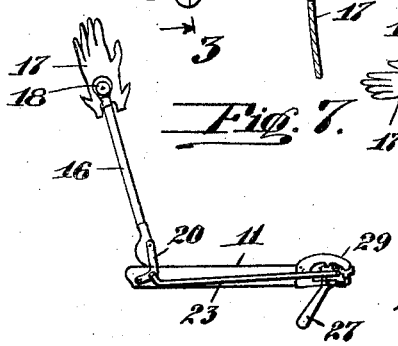
Inventor
WILLIAM J. DAVIS.

Patented Feb. 23, 1926.

1,574,146

UNITED STATES PATENT OFFICE.

WILLIAM J. DAVIS, OF REDONDO BEACH, CALIFORNIA.

MOTOR-VEHICLE DIRECTION-INDICATING SIGNAL.

Application filed July 7, 1925. Serial No. 41,965.

*To all whom it may concern:*

Be it known that I, WILLIAM J. DAVIS, a citizen of the United States, residing at Redondo Beach, in the county of Los Angeles and State of California, have invented certain new and useful Improvements in Motor-Vehicle Direction-Indicating Signals, of which the following is a specification.

My invention relates to a direction indicating signal for motor vehicles and the principal objects of my invention are to generally improve upon and simplify the existing forms of vehicle direction indicating signals, to provide a signaling device that is relatively simple in structure, capable of being easily and cheaply produced and which may be easily and quickly shifted into and out of different signaling positions, with very little effort on the part of the operator.

Further objects of my invention are, to equip the signaling arm or semaphore with an electric lamp in order that said arm or semaphore will be readily visible at night, and further, to provide the device with simple and efficient means whereby the arm or semaphore is temporarily locked or secured in all of its signaling positions.

With the foregoing and other objects in view, my invention consists in certain novel features of construction and arrangement of parts that will be hereinafter more fully described and claimed and illustrated in the accompanying drawings in which:

Fig. 1 is a front elevational view of my improved signaling device in position on the left hand portion of a motor vehicle wind shield.

Fig. 2 is an end elevational view of the signal.

Fig. 3 is a sectional view taken lengthwise through the signaling arm and showing the electrical connections to the signal lamp.

Fig. 4 is a detail elevational view of the inner end portion of the signal and showing the latching member thereof in disengaged position.

Fig. 5 is an elevational view of the signal with the arm thereof shifted into position to indicate "slow speed" or "stop."

Fig. 6 is an elevational view of the signal, with the arm thereof shifted into position to indicate or signal a "left hand turn."

Fig. 7 is an elevational view of the signal with the arm thereof shifted into position to indicate or signal a "right hand turn."

Referring by numerals to the accompanying drawings, 10 designates the left hand upright side member of the windshield frame of a motor vehicle and detachably secured thereto in any suitable manner is a horizontally disposed arm 11 that serves as a fixed support for the operating parts of the signal.

Pivotally connected by means of a pin 12 to the outer portion of arm 11 is the lower end of an upwardly projecting link 13, and the upper portion of this link is pivotally connected by means of a pin 14, to the upper portion of a short arm 15.

Secured in any suitable manner to the lower end of arm 15 is the upper end of a tubular arm 16, to the lower or outer end of which is secured a metal plate 17, shaped to represent an open hand. The lower end of arm 16 serves as a socket for a small electric lamp 18, the bulb of which occupies an opening 19 in the center of plate 17.

In order that the rays of light from the lamp 18 may be more effective in illuminating the rear surface of plate 17, the outer portion of the latter may be curved rearwardly to a slight degree and the front and rear surfaces of the lamp bulb are "spotted" with a semi-transparent material such as white paint. This latter expedient tends to direct rays of light from the lamp outwardly over the surfaces of plate 17 and at the same time prevents the glare and direct rays of light from striking the eyes of the vehicle driver.

One end of a bell crank 20 is pivotally connected by means of a pin 21 to the outer portion of arm 11 a short distance below and inwardly from pivot 12 and the outer end of said bell crank is pivotally connected by means of a pin 22 to the intermediate portion of arm 15, and a short distance below pivot pin 14. Thus link 13 and bell crank 20 function as toggle links and their pivotal connections with arms 11 and 15 are such as to swing arm 16 and parts carried thereby upwardly with very little effort or the expenditure of comparatively little power.

Pivotally connected to the intermediate portion of bell crank 20 is the outer end of a long link or connecting rod 23, that normally lies parallel with arm 11 and the inner end of this link is pivotaly connected by means of a pin 24 to the upper portion of a toothed segment 25. This segment is pivotally connected to the inner end portion of arm 11 by means of a pin or bolt 26 and depending from said segment is a handle 27.

Pivotally connected by means of a pin 28 to the outer portion of arm 11 is a detent 29 that overlies the notched edge of segment 25, and said detent is provided on its lower edge with a single tooth 30 that is adapted to engage between the teeth of said segment.

A detent lifter comprises a plate 31 that is pivoted at 32 to arm 11 and said plate is provided on its upper edge with a lug 33, that engages in a notch 34, the latter being formed in the lower edge of detent 29 near its pivot 28.

The detent lifter is provided with a handle 35 that normally occupies a position in front of pivot 26 for segment 25, in order that it may be readily engaged by the thumb of the hand that grasps handle 27.

Leading from a suitable source of electrical energy, such as a battery, through tubing arm 16 to the socket connections for lamp is a conductor 36 and another conductor 37 leads from said socket connections through arm 16 to a small metal contact plate 38 that is secured to and insulated from arm 11. This plate 38 is arranged so that it will be engaged with rubbing contact by bell crank 20 whenever the latter is swung from its normal position.

When my improved direction signal is properly installed for use, it occupies the position as illustrated in Fig. 1, with the signaling arm or semaphore occupying a substantially vertical position adjacent to the windshield side rail 10.

Under such conditions tooth 30 on the detent 29 occupies the last notch at one end of the toothed segment 25, thus holding the operating parts against movement.

To release the detent and swing the semaphore into position to indicate or signal "slow speed" or "stop", the driver of the equipped vehicle manually engages handle 27, and at the same time applies the thumb or finger to handle 35 and depresses same. This action swings plate 31 on its pivot so as to elevate lug 33, and as a result, detent 29 is swung upward, thereby disengaging tooth 30 from the notch in which it has been engaged. The operator now swings handle 17 downward, thereby partially rotating segment 25 and through link 23, bell crank 20, arm 15 and link 13, the signaling arm or semaphore will be swung outwardly and upwardly until it occupies an inclined position as illustrated in Fig. 5, and which position in motor vehicle signaling indicates "slow speed" or "stop". To lock the signal in this position, it is only necessary to release presure on handle 35, thus permitting detent 29 to drop with tooth 30 in engagement with the second one of the notches in segment 25.

To actuate the signal to indicate a "left hand turn" as illustrated in Fig 6, the handle 27 is swung into a substantially vertical position, and through the various connections, the signaling arm will be swung into a substantially horizontal position, and further movement imparted to said handle will cause said signaling arm to be swung upward into the angular position as illustrated in Fig. 7, thereby giving the signal for a "right hand turn".

The teeth on the segment 25 are formed so that it is necessary to lift detent 29 to release segment 25 when the latter is rotated to raise the arm into its second and third signaling positions, but at the same time, said teeth are shaped so that they will be engaged by tooth 30 on the detent to lock the segment and parts connected thereto against reverse movement, thereby enabling the signaling arm to be locked in any one of its signaling positions, and making it necessary for the operator to depress handle 35 to elevate the detent, when the parts return to their normal positions.

As soon as bell crank 20 has been shifted a slight distance from its normal position, it makes contact with plate 38, thereby completing the lamp circuit and, as a result, the signaling lamp 18 will be lighted as long as said bell crank is in contact with plate 38. If desired, a switch may be placed in the lamp circuit so as to open same during the daylight periods. Thus it will be seen that I have provided a motor vehicle direction indicating signal that may be easily and cheaply produced and installed, readily manipulated so as to indicate by a semaphore or signaling arm, the speed and turning movements of the equipped vehicle, and said signaling device possessing superior advantages in point of simplicity, durability and general efficiency.

It will be understood that minor changes in the size, form and construction of the various parts of my improved motor vehicle direction indicating signal may be made and substituted for those herein shown and described, wthout departing from the spirit of the invention, the scope of which is set forth in the appended claims.

I claim as my invention:

1. In a motor vehicle direction indicating signal, a horizontally disposed support, a link pivotally connected to the outer end of said support, a signaling arm pivotally connected to said link, a bell crank having one end pivotally connected to the signaling arm and the other end pivotally connected to the intermediate portion of said bell crank and lying substantially parallel with the support, an operating handle pivotally connected to the inner end of said support and to which the inner end of the operating arm is connected, said operating handle being provided at one end with a series of notches, a gravity detent for engaging said notches to hold the handle in different positions and manually operable means for disengaging said detent from the notched portion of the handle.

2. In a motor vehicle direction indicating signal, a horizontally disposed support, a link pivotally connected to the outer end of said support, a signaling arm pivotally connected to said link, a plate carried by the outer end of said signaling arm, which plate is provided with an opening, a source of light detachably seated in the end of the signaling arm and occupying a position in the opening in said plate, a bell crank having one end pivotally connected to the signaling arm and the other end pivotally connected to the intermediate portion of said bell crank and lying substantially parallel with the support, an operating handle pivotally connected to the inner end of said support and to which the inner end of the operating arm is connected, said operating handle being provided at one end with a series of notches, a gravity detent for engaging said notches to hold the handle in different positions and manually operable means for disengaging said detent from the notched portion of the handle.

3. In a motor vehicle direction indicating signal, a horizontally disposed support adapted to be secured to a fixed part of the vehicle, a link pivotally connected to the outer end of said support and normally projecting upwardly therefrom, a signaling arm pivotally connected to the upper end of said link, a bell crank having one end pivotally connected to the support and its other end pivotally connected to the signaling arm between the points of pivotal connection between the ends of the link and the support and said signaling arm, an operating rod pivotally connected to the intermediate portion of the bell crank and lying substantially parallel with the support and manually operable means on the inner end of said support for actuating said operating rod, bell crank, link and signaling arm.

In testimony whereof I affix my signature.

WILLIAM J. DAVIS.